United States Patent [19]
Weiss

[11] Patent Number: 5,928,550
[45] Date of Patent: Jul. 27, 1999

[54] POPCORN POPPER WITH INDUCTION HEATING

[75] Inventor: Ronald R. Weiss, Okeana, Ohio

[73] Assignee: Gold Medal Products Co., Cincinnati, Ohio

[21] Appl. No.: 08/844,410

[22] Filed: Apr. 18, 1997

[51] Int. Cl.[6] .................................................. H05B 6/12
[52] U.S. Cl. ...................... 219/620; 219/621; 219/622; 99/DIG. 14; 99/323.4; 426/237
[58] Field of Search ................... 219/620, 621, 219/622, 624, 635, 647, 649, 654; 99/DIG. 14, 451, 323.4, 323.5, 323.6, 323.7, 323.8, 323.9, 323.11; 426/237, 241, 242, 243, 244

[56] References Cited

U.S. PATENT DOCUMENTS

| 2,232,954 | 2/1941 | Manley | 53/4 |
|---|---|---|---|
| 2,254,271 | 9/1941 | Cretors | 53/4 |
| 2,972,282 | 2/1961 | Waas et al. | 99/238.4 |
| 3,483,281 | 12/1969 | Chisholm | 264/25 |
| 3,697,289 | 10/1972 | Day et al. | 99/81 |
| 3,790,735 | 2/1974 | Peters, Jr. | 219/624 |
| 3,812,774 | 5/1974 | Day et al. | 99/323.8 |
| 4,526,525 | 7/1985 | Oiso et al. | 425/9 |
| 5,032,699 | 7/1991 | Hu | 219/621 |
| 5,066,430 | 11/1991 | Matthews | 264/8 |
| 5,071,662 | 12/1991 | Dysarz | 99/323.5 |
| 5,363,746 | 11/1994 | Gordon | 99/328 |
| 5,460,498 | 10/1995 | Steel et al. | 425/8 |
| 5,555,792 | 9/1996 | Stein et al. | 99/323.9 |
| 5,580,594 | 12/1996 | Matsumoto | 219/622 |
| 5,662,024 | 9/1997 | Cretors et al. | 99/323.7 |
| 5,694,830 | 12/1997 | Hodgson et al. | 99/323.7 |

FOREIGN PATENT DOCUMENTS

| 1-298673 | 12/1989 | Japan | 219/621 |
|---|---|---|---|
| 6-60972 | 3/1994 | Japan | 219/620 |

*Primary Examiner*—Philip H. Leung
*Attorney, Agent, or Firm*—Wood, Herron & Evans, LLP

[57] ABSTRACT

An improved popcorn popper includes a kettle and an induction heater for imparting heat to the kettle for popping popcorn therein. The kettle has no electrical heaters, conduits or connectors and can be immersed in water for cleaning. Methods are disclosed.

8 Claims, 1 Drawing Sheet

POPCORN POPPER WITH INDUCTION HEATING

FIELD OF THE INVENTION

This invention relates to popcorn poppers and more particularly to apparatus and methods for popping popcorn in a heated kettle.

BACKGROUND OF THE INVENTION

In the past, it has been known to mount a tiltable, electrically heated kettle in a cabinet, charge it with oil and unpopped corn kernels, heat the oil and corn and dump popped popcorn into the cabinet. Electric heater elements were combined with the kettle and were connected to an electric power source via conduits and fittings either running through the kettle mounting brackets and pivot supports, or extending directly to the kettle generally from the upper regions of the cabinet housing control components for the unit.

While such systems have been useful for years, they are attended by numerous drawbacks or inherent disadvantages. For example, since the kettles are typically heated by electrical elements mounted in or on the kettles, cleaning is difficult. Frequently, if not always, the kettles cannot be immersed in water and thorough cleaning is thus hindered by the concern of wetting or leaving water around or in the vicinity of the electrical components of the kettle. And in cases where the electrical components are covered or encapsulated, the extra materials are expensive and increase manufacturing costs.

Secondly, it is usually necessary to supply about 5 to 6 thousand watts of electrical power to the kettles in order to heat them properly for corn popping, particularly in the commercial use units. The heat produced by this power conducts through the kettle and its mounting pivots and hardware, thus significantly raising the temperature of all structural parts associated with the kettle or its mounting structures. Much of the heat is not directed into the oil and corn, but is dissipated into other components and wasted as excess heat, reducing the efficiency of the power applied for corn popping.

Accordingly, it has thus been one objective of the invention to provide an improved popcorn popper wherein the popping kettle can be completely immersed in water or liquid for cleaning.

It has been a further objective of the invention to provide an improved popcorn popper wherein the kettle has no electrical components, heaters, conduits or connections.

It has been a further objective of this invention to provide an improved popcorn popper which isolates the heat power introduced to the kettle away from structures supporting the popping kettle and thus renders the popping process more efficient.

It has been a further objective of the invention to provide an improved popcorn popper having apparatus for more directly controlling the application of heat to the popping process and for reducing waste heat.

A still further objective of the invention has been to provide improved methods for heating popping kettles to pop popcorn.

SUMMARY OF THE INVENTION

To these ends, a preferred embodiment of the invention includes a popcorn popper having a popping kettle with no electrical heaters, connections or conduits. An induction heater is disposed proximate the kettle and, when energized, excites the kettle material to a state of high activity and heat production. The kettle is provided with a spout for dispensing popped corn or can be tilted to facilitate dumping the corn into a surrounding cabinet.

Since the kettle has no associated electrical components attached to it, the kettle can be removed from its mounts and totally immersed in water or liquid for cleaning, without fear of wetting or contaminating any electrical component.

A directional heat induction is preferably used so inductive heating energy is directed precisely to the kettle where popping heat is required. The kettle is raised to popping heat much more quickly and evenly than when relying on electrical heaters localized in the kettle structure.

Moreover, since the heat can be more directed and localized, as compared to prior electrical resistance heating, the kettle mounting and other associated components are not heated to the same degree as in the past. Also, they can be made of non-ferrous materials so they are not heated by the induction heater.

BRIEF DESCRIPTION OF THE DRAWINGS

These and other objectives and advantages will become even more readily apparent from the following written description of a preferred embodiment of the invention and from the drawings in which.

DETAILED DESCRIPTION OF THE INVENTION

Figure 1:
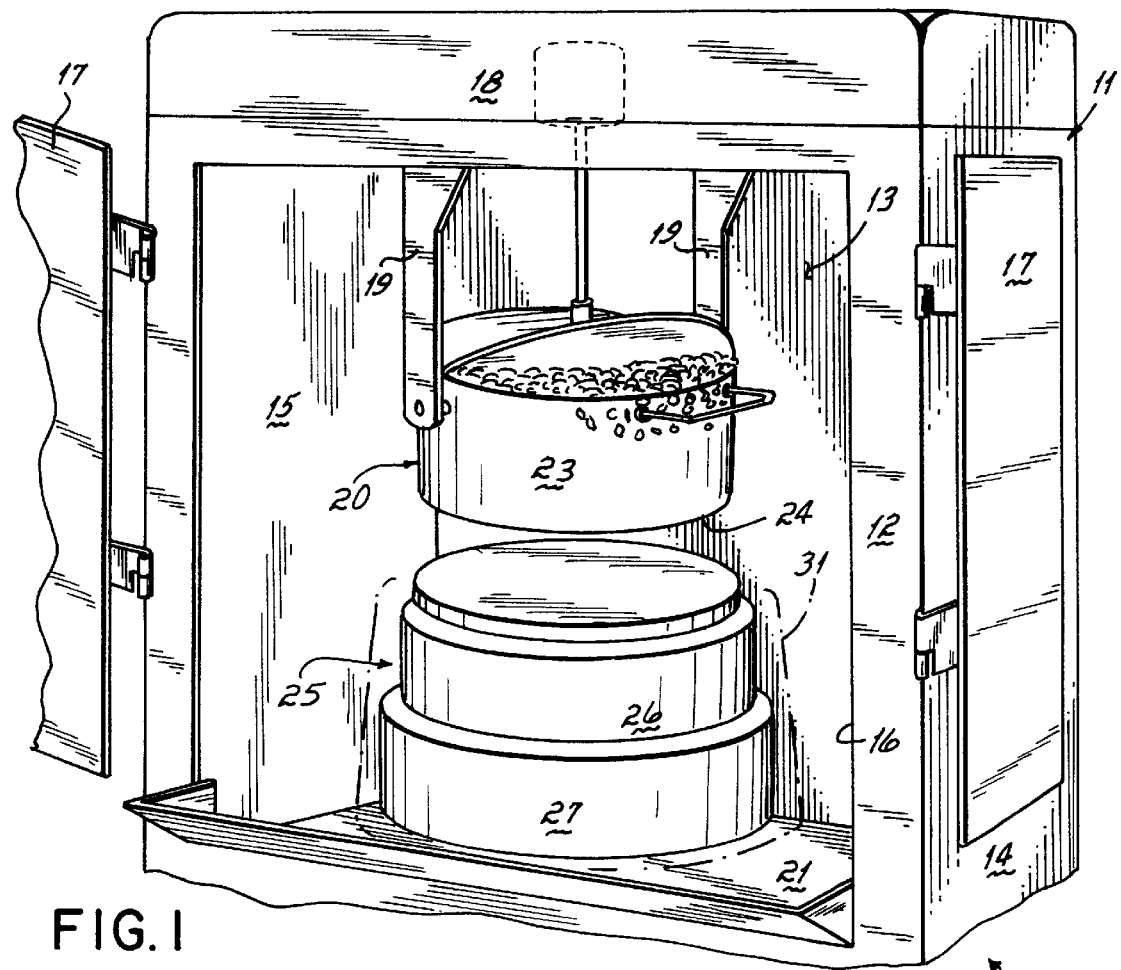
FIG. 1 is a perspective view of a popcorn popper according to a preferred embodiment of the invention.
Figure 2:
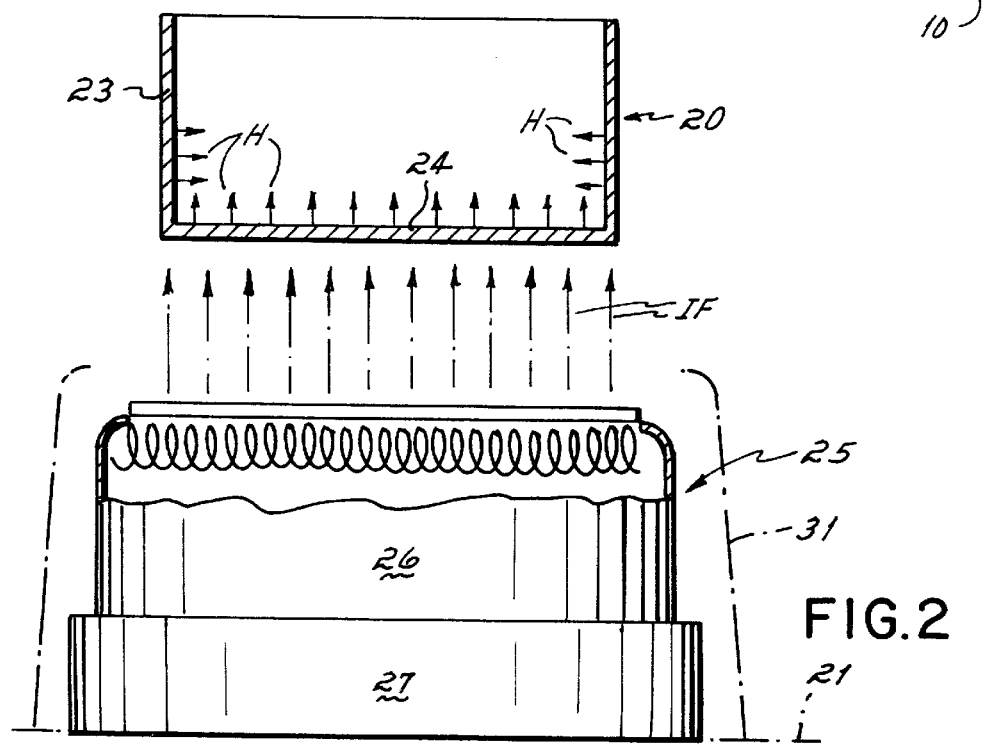
FIG. 2 is a diagrammatic view of a kettle and induction heater according to the invention as shown in FIG. 1.

Turning now to the drawings, there is shown in FIG. 1 a diagrammatic view of an inductively heated popcorn popper 10 according to the invention. Popper 10 includes a cabinet 11 having front and rear sides 12, 13 and ends 14, 15. Front side 12 has an opening 16 and a pair of doors 17. A top area 18 houses electrical and mechanical components of the popper such as a rotor motor (dotted lines, FIG. 1) for the kettle rotor, and brackets 19 depend from top 18 to support tiltable kettle 20. Suitable pivot connections are used as are well known for pivotally mounting the kettle and for allowing its dismounting for cleaning. The brackets 19 can be made of non-ferrous material.

The cabinet has a floor 21 for receiving popped popcorn from the kettle 20.

An induction heater 25 is disposed in the popper 10 preferably, but not necessarily, directly beneath kettle 20. Induction heater 25 includes an inductor 26 and generator 27 for generating an energy or induction field (arrows "IF") onto kettle 20. Any suitable form of induction heater 25 can be used, preferably of the unidirectional type.

When energized, heater 25 is operable to heat the side wall 23 and bottom 24 of kettle 20. In this way, just the kettle is heated for conducting heat (arrows "H") into oil and popcorn within the kettle. It is not necessary to heat any other parts such as the brackets 19, or other components. Heat power is thus localized in the kettle and only sufficient power to heat the kettle and pop the corn is required. It is thus no longer necessary to require 5000 to 6000 watts to the bottom of the pot, and extraneous components outside the kettle are not heated. The kettle can be heated faster than the directly electrically coupled past heaters, and the heat is more easily controlled.

Since the kettle is inductively heated, it is not necessary to route wires and electrical conductors through the various pivoted or flexible joints of the kettle supports. Also, since there are no electrical parts in the kettle, not only can it be immersed for cleaning, but the kettle design does not require additional materials for accommodating, enclosing or covering electrical heaters or components.

It should be appreciated that the induction heater 25 does nor itself get hot so that popcorn can be popped in the kettle 20, then dumped into the cabinet onto the floor 21 and the heater 25, where it can be collected for boxing, bagging or storing.

Of course, the induction heater 25 can be covered with a protective shell 31 of non-ferrous material which can be readily removed for cleaning, or cleaned in place.

Moreover, various cabinets and cabinet materials can be used, as well as various kettles and mounting or operating apparatus for filling or automating the popping process.

These and other features and modifications may be readily appreciated from the foregoing, without departing from the scope or spirit of the invention, and applicant intends to be bound only by the claims appended hereto.

What is claimed is:

1. A popcorn popper including:
   a cabinet:
   a support mechanism mounted in said cabinet;
   a popping kettle removably supported by said support mechanism for holding corn to be popped and for dumping popped popcorn into said cabinet; and
   a magnetic induction heating source mounted in said cabinet and disposed in spaced, non-contacting relationship with said kettle for directing a magnetic energy field oriented on said kettle, said magnetic energy field being operable to excite and thereby heat said kettle to raise the corn temperature to a level where it pops.

2. Apparatus as in claim 1 wherein said support mechanism includes a pair of spaced brackets.

3. Apparatus as in claim 2 wherein said kettle is pivotally mounted on said brackets in said cabinet and wherein said induction heating source is operably disposed beneath said kettle.

4. Apparatus as in claim 3 wherein said kettle is made of ferrous material and said brackets are made of non-ferrous material.

5. Apparatus as in claim 1 wherein said induction heating source is unidirectional to generate a magnetic field oriented on said kettle.

6. A method of popping popcorn comprising the steps of:
   providing a cabinet;
   mounting a support mechanism in said cabinet;
   removably supporting a popping kettle on said support mechanism for holding corn to be popped and for dumping popped popcorn into said cabinet:
   introducing unpopped popcorn into said kettle;
   providing a magnetic induction heating source in said cabinet for generating a magnetic energy field;
   directing said magnetic energy field onto said kettle; and
   exciting said kettle with said magnetic energy field to thereby raise the temperature of said kettle to pop the corn therein.

7. A method as in claim 6 including the step of dumping popped popcorn from said kettle.

8. A method as in claim 7 including the step of cleaning said kettle, after popping popcorn therein, including immersing said kettle in water.

* * * * *